United States Patent Office 3,122,417
Patented Feb. 25, 1964

3,122,417
STABILIZING AGENT FOR PEROXY-COMPOUNDS AND THEIR SOLUTIONS
Bruno Blaser, Dusseldorf-Urdenbach, and Karl-Heinz Worms and Joachim Schiefer, Dusseldorf, Germany, assignors to Henkel & Cie G.m.b.H., Dusseldorf-Holthausen, Germany, a corporation
No Drawing. Filed Jan. 31, 1962, Ser. No. 170,221
Claims priority, application Germany June 3, 1959
1 Claim. (Cl. 23—207.5)

The invention relates to agents for the stabilization of peroxy-compounds and of their solutions and, more particularly, to acylation products of phosphorous acid as such stabilizers. It is a continuation-in-part of our copending application Ser. No. 29,778, filed May 18, 1960, now abandoned.

As is well known, peroxy-compounds and their solutions have a more or less pronounced tendency toward decomposition depending upon a number of different factors, e.g., temperature and pH value. Hence, numerous compounds have been proposed for their stabilization and thus a prolongation of the storage limit. In any event, it is attempted in this manner to prevent or at least delay the loss of oxygen for a long period of time. A well-known stabilizer, e.g., is magnesium silicate which, however, suffers from the considerable drawback of being practically insoluble in water. With stabilizers which are readily dissolved in water, such as dipicolinic acid, quinolinic acid or polyphosphates, to name but a few, good results at stabilization can be obtained under certain conditions. However, it has been found that the effectiveness of these agents diminishes or even fully disappears with changes in the prevailing conditions. For instance, peroxy-solutions can be well stabilized with the above-named agents in acid media whereas in alkaline media, especially at a pH above 10, only very unsatisfactory results are obtained.

It now has been found that acylation products of phosphorous acid are eminently suited as stabilizers for peroxy-compounds and their solutions. These products have the great advantage of being effective not only in acid medium but are particularly useful as stabilizers in a pH range of 10–13, i.e., in highly alkaline medium which frequently is encountered in practice.

The acylation products of phosphorous acid to be used as stabilizers for peroxy-compounds or their solutions according to the invention can be prepared by various methods known per se, of which we cite the following as examples without limiting ourselves thereto:

Beilstein, Handbuch der organischen Chemie, 4th ed., vol. 2, pp. 171–172;
Journal Organic Chemistry (23), 1958, pp. 830–831;
JACS 34, pp. 492–499;
German printed published patent application 1,010,965.

The acylation products thus prepared, depending upon the method used, are obtained in pure form or as mixtures.

Suitable methods of preparation consist in reacting phosphorous acid with aliphatic organic acid anhydrides and/or acid chlorides which have 2 to 6 carbon atoms. For example, but without limitation thereto, phosphorous acid and acetic anhydride are heated at 20–120° C. in molar proportions of 1:1 to 1:2, or phosphorous acid is reacted with acetic anhydride and acetyl chloride in equimolar proportions at 70–120° C.

Further, pyrophosphorous acid of the Formula 1

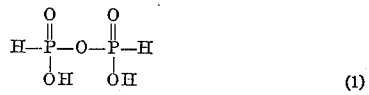

(1)

can be reacted with acetic anhydride in molar proportions of 1:1 to 1:2 at 20–120° C. Finally, reactions with other acylating agents can be carried out, such as with ketene acetal, ketene and others.

Of products with established constitution, particularly the following are to be named, i.e., those having Formulae 2, 3 and 4, respectively:

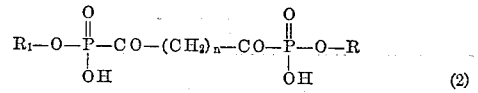

(2)

wherein $n$ is a whole number from 1 to 6, and R and $R_1$ denote hydrogen or an alkyl radical having from 1 to 4 carbon atoms.

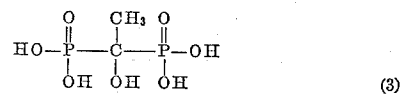

(3)

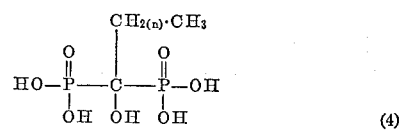

(4)

In Formula 4, the "$n$" is a numeral from 1 to 4.

Instead of the acids, in practice often the corresponding alkali salts are employed, such as the sodium, potassium or ammonium salts or salts of organic amines. However, if desired, instead of the alkali salts or acids, the corresponding monoesters can also be used. For the latter, preferably such products are used which are partly esterified with lower alcohols, such as methanol, ethanol, n-propanol, isopropanol or butanol, and which are water-soluble.

These novel stabilizers can be added to the peroxy-compounds in dissolved form or as solids. The peroxy-compounds themselves thereby may be present in dry form or as a solution. The stabilizers, in practice, usually are employed in a concentration of 0.5–3 percent. The addition of the stabilizers to such solutions is carried out customarily in amounts of 0.03–0.15 percent by weight, calculated on the total solution. The quantity required for stabilization can easily be determined according to the prevailing conditions, whereby advantageously somewhat higher amounts of stabilizer are added to more highly concentrated peroxy-compounds in alkaline solution.

Peroxy-compounds which can be stabilized in this manner are, aside from hydrogen peroxide and its addition compounds, urea percompounds, perborates, persulfates and peracids, e.g., persulfuric acid and peracetic acid, especially in form of their water-soluble compounds, such as their sodium, potassium and ammonium salts and salts of organic amines, such as ethanolamine. Compounds of this kind are used in practice predominantly for bleaching, disingesting and oxidizing purposes, at times together with other known additives.

The invention now will be further explained by the following examples which give a number of test results showing surprising and considerably higher effect of the novel stabilizers as compared to those known today, especially in alkaline medium. However, it should be understood that these examples are given merely by way of illustration, not of limitation, and that numerous changes may be made in the details without departing from the spirit and the scope of the invention as hereinafter claimed.

EXAMPLE 1

Table 1 below shows the decrease of the $H_2O_2$-contents of solutions containing several different stabilizers after allowing them to stand in glass vessels at 20° C. for 11, 25 and 50 days, respectively. These solutions each contained 10 g. $H_2O_2$, 1.5 g. stabilizer as listed and 10 g. $K_4P_2O_7$ as buffer per liter. The solutions were adjusted to a pH of 10 with potassium hydroxide solution. The addition of the buffer is opportune because otherwise a change in pH occurs in the course of time so that a true comparison of the results becomes difficult.

With other acetyl derivatives of phosphorous acid, as obtained by the above-mentioned known processes by reacting phosphorous acid with acetic anhydride or acetyl chloride, similar results are obtained.

Table 1

| Stabilizer | Percent $H_2O_2$—Loss after— | | |
|---|---|---|---|
| | 11 days | 25 days | 50 days |
| No stabilizer (check) | 25 | 53 | 93 |
| Phosphone acetic acid | 29 | 73 | 99 |
| 2,6-dicarboxy ethoxyamino pyridine | 26 | 60 | 86 |
| Dipicolinic acid | 62 | 68 | 70 |
| Pyridine-N-oxide | 14 | 49 | 70 |
| 2,6-diamino pyridine | 26 | 29 | 32 |
| Nitrilo triacetic acid | 8 | 16 | 30 |
| Sodium acetophosphonate [1] | 3 | 5 | 10 |
| Reaction product of phosphorus acid with propionic anhydride (sodium salt) | 2 | 4 | 5 |
| Reaction product of phosphorus acid with butyric anhydride (sodium salt) | 5 | 7 | 14 |
| Reaction product of phosphorus acid with caproic anhydride (sodium salt) | 6 | 9 | 17 |

[1] Sodium salt of the so-called "acetylphosphorus acid," according to Brooks, JACS 34 (1912), 496.

EXAMPLE 2

Table 2 shows the decrease of the oxygen-content of solutions containing 4.85 g. sodium perborate $$(NaBO_2 \cdot H_2O_2 \cdot 3H_2O$$

having 10.3% = 0.5 g. active oxygen), and 0.5 g. of the stabilizer named, per liter. The pH of these solutions is 10.3.

Table 2

| Stabilizer | Percent Oxygen Loss at 50° C. after— | | |
|---|---|---|---|
| | 2 hrs. | 30 hrs. | 50 hrs. |
| No stabilizer (check) | 51 | 68 | 81 |
| Nitrilo triacetic acid | 17 | 47 | 55 |
| Sodium acetophosphonate | 9 | 9 | 9 |
| Reaction product of phosphorus acid with acetic anhydride (sodium salt) | 9 | 11 | 17 |
| Reaction product of phosphorus acid with acetyl chloride (sodium salt) | 9 | 9 | 9 |
| Disodium salt of adipinoyl-diphosphonic acid-(P,P') diethyl ester | 9 | 9 | 9 |

EXAMPLE 3

Table 3 shows the loss of oxygen after 16, 24 and 40 hours, respectively, at 50° C., incurred by solutions containing 7.75 g. potassium monopersulfate ($KHSO_5$, having 6.46% = 0.5 g. active oxygen), and 0.5 g. of the stabilizer listed, per liter. The pH of the solutions was approximately 2.5.

Table 3

| Stabilizer | Percent Oxygen Loss at 50° after— | | |
|---|---|---|---|
| | 16 hrs. | 24 hrs. | 40 hrs. |
| No stabilizer (check) | 25 | 29 | 41 |
| Nitrilo triacetic acid | 25 | 28 | 31 |
| Sodium acetophosphonate | 6 | 9 | 10 |
| Reaction product of phosphorous acid with acetic anhydride (potassium salt) | 11 | 11 | 12 |
| Reaction product of phosphorous acid with acetyl chloride (sodium salt) | 7 | 12 | 14 |
| Disodium salt of adepinoyl-diphosphonic acid-(P,P')-diethyl ester | 7 | 9 | 10 |

EXAMPLE 4

Table 4 lists the $H_2O_2$ loss of solutions containing 10 g. $H_2O_2$, 10 g. $K_4P_2O_7$ and 1.5 sodium acetophosphonate as stabilizer per liter at different pH-values after 20 and 50 days, respectively, as compared to solutions of the same composition but without stabilizer. The tests were carried out at 20° C. in polyethylene bottles.

Table 4

| Stabilizer | pH | Percent Oxygen Loss $H_2O_2$ after— | |
|---|---|---|---|
| | | 20 days | 50 days |
| No stabilizer | 10 | 42 | 93 |
| Do | 11 | 100 | |
| Sodium acetophosphonate | 10 | 1 | 7 |
| Do | 11 | 3 | 7.5 |
| Do | 12 | 3.5 | 11 |
| Do | 13 | 9 | 24.5 |

EXAMPLE 5

110 g. potassium pyrophosphate were mixed with 102 g. of a hydrogen peroxide solution (33.3 percent by weight $H_2O_2$) and dried in vacuo at 3–5 mm. Hg at 50° C. The sodium pyrophosphate perhydrate thus obtained had an active oxygen content of 11.04 percent by weight.

A second product was prepared in the same manner, but with the addition of 0.3 g. sodium acetophosphonate (prepared as described in Example 1). The active oxygen content of this second product was 11.02 percent by weight. Both products were stored at 50° C., and afterwards the active oxygen content was determined.

After 10 days, the active oxygen content of the unstabilized product was 10 percent by weight, after 20 days 9.28 percent, whereas the stabilized material had 10.5 percent active oxygen after 10 days and 9.9 percent after 20 days.

EXAMPLE 6

To 50 g. peracetic acid (52.7 percent by weight) containing 0.8 percent by weight $H_2O_2$ and a total content on active oxygen of 11.5 percent, 0.15 g. of the acylation product of phosphorous acid were added, and the product stored at 20° C.

After three months, the total content on active oxygen still was 10.4 percent. By comparison, an unstabilized sample of the same acid, under the same conditions, had an active oxygen content of only 5.1 percent.

Other aliphatic and aromatic mono- and dicarboxylic acids also were stabilized with acylation products of phosphorous acid, particularly, performic acid, monoperphthalic acid and persebacic acid.

We claim as our invention:

A process for the stabilization of peroxy compounds, which comprises admixing to said peroxy compounds 0.5 to 3 percent by weight of a material selected from the group consisting of reaction products of phosphorous acid with substances selected from the group consisting of anhydrides and chlorides of aliphatic acids having 2 to 6 carbon atoms; sodium, potassium, ammonium and ethanolamine salts of said reaction products; methanol, ethanol, n-propanol, isopropanol, and butanol esters of said reaction products; said reaction products having a characteristic composition selected from the group consisting of (a)
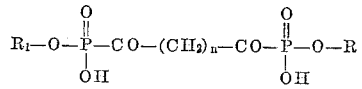

wherein $n$ is a whole number from 1 to 6, and R and $R_1$ are selected from the group consisting of hydrogen and an alkyl radical having from 1 to 4 carbon atoms;

(b)
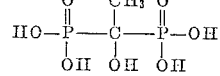

and (c)
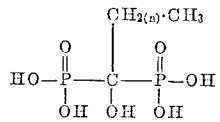

wherein $n$ is a whole number from 1 to 4.

No references cited.